March 19, 1968     I. NIRENBERG     3,373,524
ELECTRICALLY OPERATED VEHICLE AND MODULE
FOR A COURSE FOR THE VEHICLE
Filed Dec. 9, 1965     2 Sheets-Sheet 1
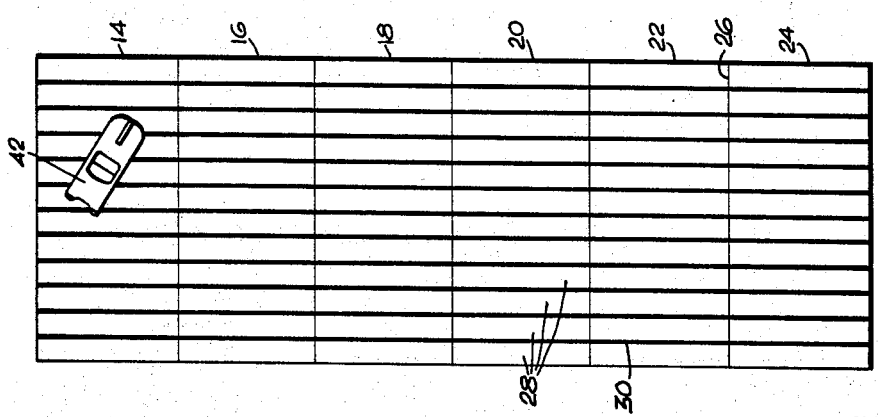
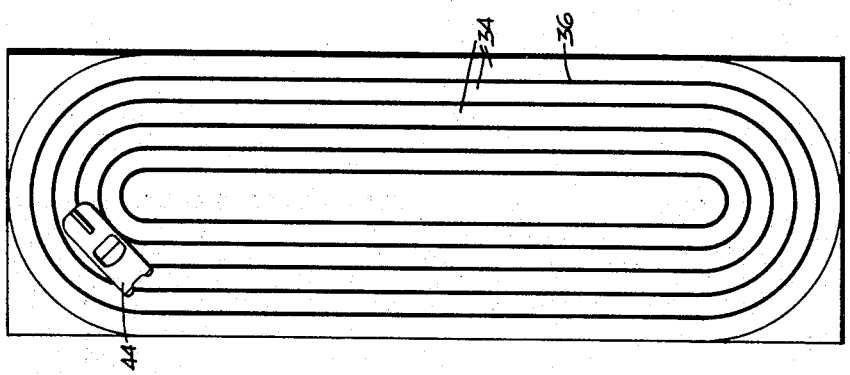
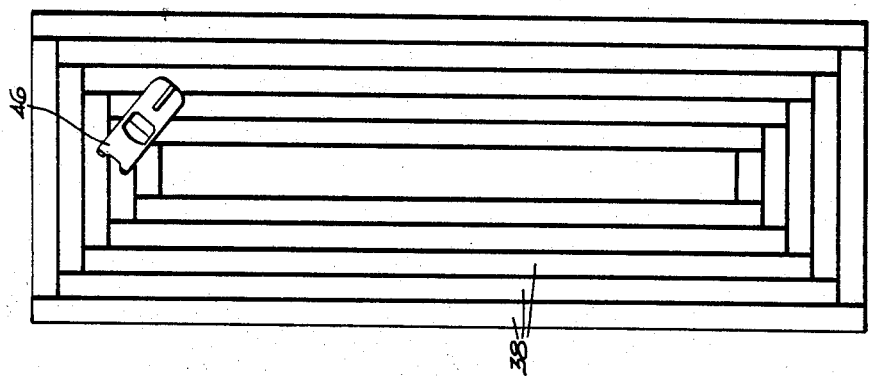
INVENTOR.
IRVING NIRENBERG
BY *John Cyril Malloy*
ATTORNEY.

March 19, 1968  I. NIRENBERG  3,373,524
ELECTRICALLY OPERATED VEHICLE AND MODULE
FOR A COURSE FOR THE VEHICLE
Filed Dec. 9, 1965  2 Sheets-Sheet 2
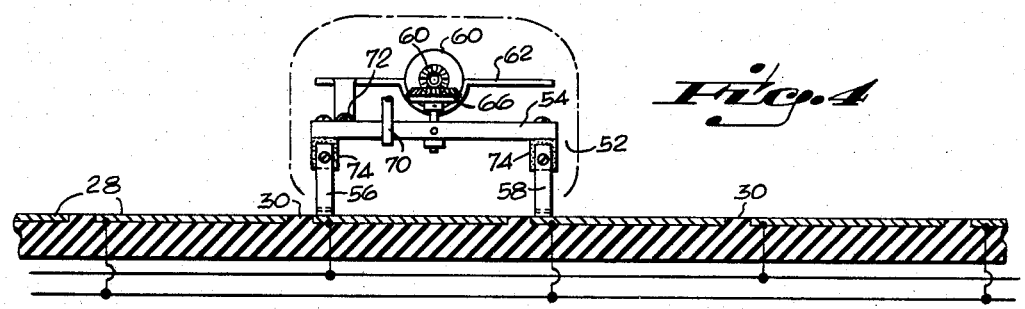
FIG. 4
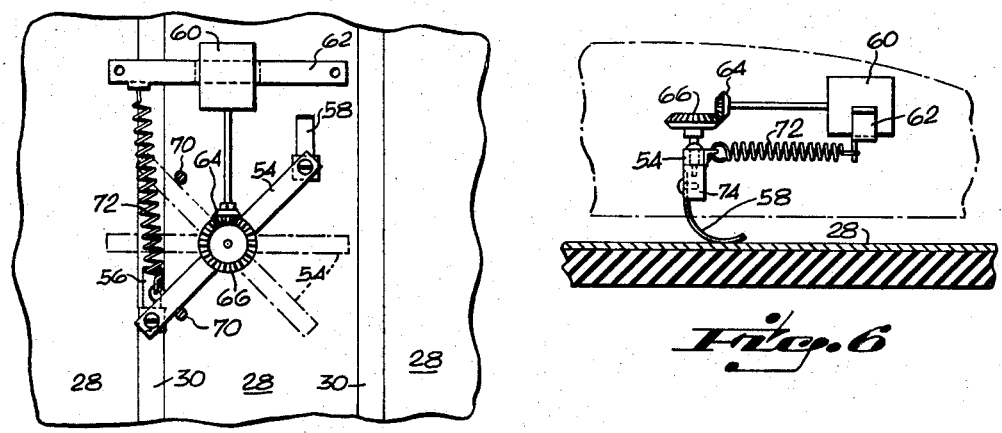
FIG. 5
FIG. 6
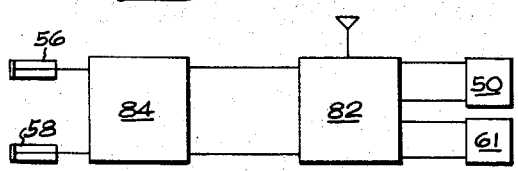
FIG. 7
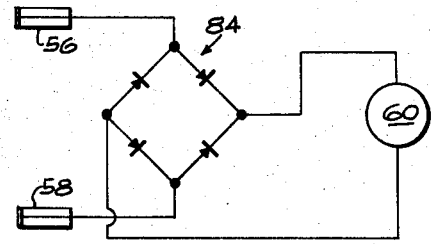
FIG. 8
INVENTOR.
IRVING NIRENBERG
BY John Cyril Malloy
ATTORNEY.

United States Patent Office 3,373,524
Patented Mar. 19, 1968

3,373,524
ELECTRICALLY OPERATED VEHICLE AND MODULE FOR A COURSE FOR THE VEHICLE
Irving Nirenberg, Opa-Locka, Fla., assignor of fifty percent to Louis Barreiro, Miami, Fla.
Filed Dec. 9, 1965, Ser. No. 512,754
6 Claims. (Cl. 46—244)

This invention relates to a module for inclusion in a table for the purpose of supplying electrical current to a vehicle for the purpose of propelling it over the table.

In recent times it has become popular to race vehicles having electrical drive means over a table, the said vehicle having wiper brushes to engage the table and conduct electrical current to the drive means. The tables are provided with tracks which define a closed path over which the vehicles travel. One disadvantage of such table is that the tracks of the table, which carry the electrical current from a power source, restrict the travel of the vehicle so that it can only travel a predetermined path, and if the vehicle leaves that predetermined path, such as when it goes around a sharp turn, current flow from the power source is interrupted and the vehicle stops.

It is an object of this invention to provide a table having modules with conductors embedded therein and arranged in such a fashion that current flow to a vehicle will not be interrupted.

It is another object of this invention to provide a module for inclusion in a table over which an electrically-operated vehicle is adapted to be moved, the said vehicle being adapted to wipe and thereby receive current from the conductors of the module.

It is a general object of this invention to provide a vehicle and a module for a table over which the vehicle is to be moved by electrical current fed to a drive means in the vehicle which is relatively inexpensive to manufacture, adaptable for use in combination with other such modules to define a relatively long or large course over which a vehicle may be traveled and which is relatively simple in construction, inexpensive to manufacture and otherwise well adapted for the purposes for which it is intended.

In accordance with these and other objects which will become apparent hereinafter, the instant invention will now be described with reference to the accompanying drawings in which:

FIG. 1 is a plan view of a race course composed of several modules;

FIG. 2 is a plan view of an alternative type of course using the instant invention;

FIG. 3 is an alternative view of a course using the instant invention;

FIG. 4 is a front elevation view illustrating the vehicle operatively engaging a module of the course;

FIG. 5 is a plan view schematically illustrating the sensor operation of the vehicle whereby the wiper brushes are caused to move at all times toward a position such that current flows to the vehicle;

FIG. 6 is a side elevation view of FIG. 5;

FIG. 7 is a schematic diagram illustrating the electrical arrangement of the parts of the instant invention; and FIG. 8 is an electrical schematic diagram illustrating the electrical components of the instant invention when DC current is used to supply it.

With reference to the accompanying drawings wherein like reference characters designate like or corresponding parts throughout the different views, it will be seen that the course designated by the numeral 12 of FIG. 1 is composed of a plurality of individual segments or modules such as 14, 16, 18, 20, 22 and 24 connected along the lines such as that designated by the numeral 26. Each of the segments is provided with a plurality of conductors such as that designated by the numeral 28. The conductors are spaced from one another and in FIG. 1 are shown in parallel relation fastened over the one main surface of the module with a bed 30 therebetween of insulating material serving to separate the strips and to define a planer surface for the segments and, consequently, the bed when the segments are connected together.

FIG. 2 is similar in construction to that of FIG. 1 with the exception that it comprises a single piece course, the conductor strips being designated by the numeral 34 and the bed of insulating material being designated by the numeral 36. The same is true with respect to FIG. 3 in which case the conductor strips 38 are straight, as opposed to the oval-shaped strips of FIG. 2, and are likewise embedded in an insulating material so as to define a course over which a vehicle such as that designated by the numerals 42, 44 and 46 of FIGS. 1, 2 and 3 respectively may be caused to travel. The vehicles are provided with an electrical motor 50, not shown structurally but designated by the numeral 50 in FIG. 7, which, when energized, by means of wiper pads to be described which electrically contact the conductor strips of the course, pick up a current passing through the conductors and thus energize the motor 50 which in turn is connected by suitable drive means to propel the vehicle over the course.

Referring to FIGS. 5 and 6, there is supported on the underside 52 of the vehicle a support bar 54 from which the wipers 56 and 58 depend. The wipers engage the strip and so long as the engagement is maintained supply current to the drive means 50 to propel the vehicle. It will be readily apparent on reference to FIG. 2 that as the vehicle goes around the curve in tracing an oval path somewhat similar to that indicated in FIG. 2, the wiper contact will be lost. To overcome this objectionable feature a second motor 60 is provided which is supported as by the bar 62 to the underside of the chassis 52. So long as this motor is energized its drive shaft, which is provided with gear 64 to engage a companulately-shaped gear 66 on the bar 54, will keep one end of the bar 56 against a stop pin 70 and at the same time store energy in the spring 72. When contact is lost the motor 60, since it is no longer energized, will cause the spring 72 to relax and move the end of the member and, consequently, the wipers 56 and 58 along an arcuate path until the member 54 is in the dotted line position shown in FIG. 5. In such movement the wipers will again come into contact with the conductor strips and energize the motor. This process will be repeated until the vehicle is again moving with the wipers in steady current-conducting contact with the conductors. The wipers are pivotally connected on members such as 74 to accommodate alignment of the wipers so that the maximum surface-engaging contact is maintained tracing a path parallel to the direction of the vehicle; although the pivotal connection has been found to be preferred it is not required.

Referring to FIG. 4, it will be seen that each of the conductor strips are connected to a conductor of opposite polarity so that when bridged by the two wipers 56 and 58 the current will be permitted to flow through the circuit now to be described with reference to FIG. 7.

The circuit of FIG. 7 which is for the purpose of energizing the drive motor 50 and the steering motor 61 is preferably provided with a radio receiver 82 and, also, may be provided with a voltage rectifier 84. The purpose of the radio receiver 82 is to provide a control for the amount of power delivered to each vehicle whereby control of the speed and direction can be maintained. Two methods may be utilized: That of radio transmission and that of a controlled carrier transmission. In both systems the receiver 82 is used, the receiver being supported on the vehicle and being responsive only to signals transmitted over a predetermined frequency; FIG. 7 illustrates a typical arrangement for a vehicle using a DC motor when radio transmission through the air is utilized. It will be readily apparent in the event a controlled carrier transmission system is used, it is not required that the receiver have an antenna because the signal is transmitted through the wipers and the roadway. The receiver in response to the signals alters the amount of current flow to the steering motor and the drive motor, and in this manner an operator may from a remote point transmit a signal to control the direction of the vehicle and, in addition, the speed of the vehicle. For instance, when the vehicle is making a turn it will be important to reduce the velocity and to steer the vehicle. The conductive strips of the various segments of the course or bed may be energized by means of alternating or direct current. In the event that direct current is utilized a rectifier 84, shown in detail in FIG. 8, is to be provided. This is for the reason that the adjacent strips will be of different polarity and the brushes or wipers on a vehicle will engage two of the conductor strips of the course by reason of the aforesaid structure and the rectifier will cause the current to flow at all times in the same direction through the motor irrespective of any changes taking place at the input by reason of changes in direction of the vehicle with respect to the conductor strips. In the event that the motor is AC type of motor the rectifier is not to be used, and if it is a DC motor the rectifier bridge will again allow only the positive desired current to flow through the motors.

Thus, it is seen that one may drive the vehicle by transmitting signals to the receiver and in this manner control the velocity and the direction of the vehicle while it is driven over the course. It will be apparent that the spacing between the wipers or brushes are of a module surface-engaging area such that the greatest distance through the area is less than the smallest distance between any two strips and in this manner the brushes can only engage one strip at any one time. Further, the distance between the center line of the brushes of the body are the same as or multiple of the distance between the center lines of insulating material on either side of the strips. The conductor strips may be connected to the base or bed in any suitable manner so that they remain flush for electrical contact with the wipers; for instance, the conductors may be nailed, stapled, glued, molded, wedged or secured in any other feasible way to the insulating material of the bed. It will also be apparent that the conducting strips may, by reason of the aforesaid structure, be laid on the base or bed in varying patterns such as those shown in FIGS. 1, 2 and 3; it will be apparent that the strips may be laid diagonally or in a criss-crossed pattern so that the overall size of a layout may vary and the examples shown being merely for purposes of illustration of the invention.

By reason of the aforesaid, a race course for vehicles to travel over may be assembled from sections, segments or modules, each of which is constructed in accordance with this invention, and in this manner varying size of race courses can be developed to be powered from a single source and the vehicles themselves controlled as to speed and direction by means of different frequencies to signal the control means carried in the vehicles. It is thus seen that the vehicle is unrestricted and is free of limiting encumbrances such as slots or rails with respect to which it must travel in moving on the course and more freedom of movement is provided and permitted of the vehicle. Referring to the steering motor 61, shown in FIG. 7, this motor is carried on the vehicle and is suitably arranged thereon to deflect the vehicle as it is traveled over a roadway or course and as set forth hereinbefore is arranged to receive current flow when the wipers are in engagement with the conductors of the roadway and the current flow through the steering motor is controlled by a separate signal than that which controls the drive means.

While the instant invention has been shown and described herein in what is conceived to be the most practical and preferred embodiment, it is recognized that departures may be made therefrom within the scope of the invention, which is, therefore, not to be limited to the details disclosed herein but is to be accorded the full scope of the claims so as to embrace any and all equivalent apparatus and articles.

What is claimed is:

1. In combination, a movable member and a track; said track being composed of at least one module, each of said modules of said track comprising; a bed of insulating material, a plurality of spaced conductive strips in generally parallel relation fastened over one main surface of the module, said insulating material of said bed separating said strips and defining a common exterior plane for the module between the strip, each of said strips being flush with said surface and separated from the other strips by said insulating material; each of the strips being of one polarity when electrically connected to a power source which is opposite to the polarity of the strips adjacent and abutting the insulation material along said strip; means electrically connecting each of said strips to a power source to permit current flow through any two parallel strips separated by said insulating material when the strips are bridged by an electrically conductive material; said movable member comprising: a body movably supported on the module, a first and a second spaced contact brush of electrically conductive material depending from said body and arranged to engage the surface of the module when the vehicle is supported thereon; each of said brushes being of a minimum module surface-engaging area such that the greatest distance through the area is less than the smallest distance between any two strips so that each brush can only engage one strip at any one time; the distance between the center line of the brushes of the body being the same as or a multiple of the distance between the center lines of insulating material on either side of the strips; drive means on the body and electrical conductor means to connect said drive means to each of the brushes to be energized on current flow from said source, said drive means being arranged to propel the body over the surface of the track; control means on the body electrically in series between the brushes and the drive means to control current flow to the drive means; and signaling means remote from said body to operate said control means, said control means being responsive to the signaling means to vary the current flow to the drive means; a bridging member is provided to support the brushes in spaced relation, said bridging member being rotatably mounted on said body; spring means connecting said member and said body to normally urge said member into a first position; a sensing drive means on said body and mechanically connected to said member to normally urge said member into a second position angularly displaced relative to said first position; stop means to limit movement of said member; said third drive means being normally energized when said brushes are in engagement with strips of opposite polarity and said sensing drive means being adapted to overcome the tension of said spring when energized whereby the spring will rotate the brushes on interruption of current flow as when one of the brushes is in engagement with insulating material, so that the motor will become energized again.

2. The combination as set forth in claim 1 wherein said signaling means comprises a receiver on said body and a transmitter remote from said body to control said transmitter and regulate the current flow to said drive means.

3. The combination as set forth in claim 1 wherein, the signaling means is electrically connected to said strips to signal the control means and thereby regulate the amount of current flow to the drive means.

4. The device as set forth in claim 1 wherein said body includes a steering motor and steering means supported on said body, said steering means arranged on said body to deflect the path of the body when traveling over a surface of the track, means connecting said steering means and said steering drive means mechanically; a control means for said steering means to vary the current flow to the steering motor, and signaling means remote from said body for signaling said control means to vary the current to said steering motor.

5. The combination as set forth in claim 4 wherein said signaling means comprises a receiver on said body and a transmitter remote from said body to control said transmitter and regulate the current flow to said drive means.

6. The combination as set forth in claim 4 wherein the signaling means is electrically connected to said strips to signal the control means and thereby regulate the amount of current flow to the drive means.

References Cited

UNITED STATES PATENTS

| 3,205,618 | 9/1965 | Heytow | 46—244 |
| 3,339,307 | 9/1967 | Floyd et al. | 46—232 X |

LOUIS G. MANCENE, *Primary Examiner.*

R. CUTTING, *Assistant Examiner.*